United States Patent
Bajaj et al.

(10) Patent No.: US 8,060,916 B2
(45) Date of Patent: Nov. 15, 2011

(54) SYSTEM AND METHOD FOR WEBSITE AUTHENTICATION USING A SHARED SECRET

(75) Inventors: Siddharth Bajaj, San Francisco, CA (US); Roxana Alina Bradescu, San Mateo, CA (US); Jeffrey Burstein, San Jose, CA (US); David M'Raihi, San Carlos, CA (US); Nicolas Popp, Menlo Park, CA (US)

(73) Assignee: Symantec Corporation, Mountain View, CA (US)

( * ) Notice: Subject to any disclaimer, the term of this patent is extended or adjusted under 35 U.S.C. 154(b) by 1317 days.

(21) Appl. No.: 11/593,036

(22) Filed: Nov. 6, 2006

(65) Prior Publication Data

US 2008/0109657 A1  May 8, 2008

(51) Int. Cl.
*H04L 29/06* (2006.01)
*G06F 21/00* (2006.01)
(52) U.S. Cl. .......................................... 726/3; 713/168
(58) Field of Classification Search .................. 713/167, 713/169–170, 175, 183; 726/27–30, 2–6, 726/8, 12, 20–21, 16–18
See application file for complete search history.

(56) References Cited

U.S. PATENT DOCUMENTS

| | | | |
|---|---|---|---|
| 6,463,533 B1 | 10/2002 | Calamera et al. | |
| 7,120,928 B2* | 10/2006 | Sheth et al. | 726/4 |
| 7,337,324 B2* | 2/2008 | Benaloh et al. | 713/182 |
| 7,606,915 B1* | 10/2009 | Calinov et al. | 709/229 |
| 7,653,814 B2* | 1/2010 | Carro | 713/170 |
| 7,698,735 B2* | 4/2010 | Dujari et al. | 726/8 |
| 2001/0021978 A1 | 9/2001 | Okayasu et al. | |
| 2003/0004892 A1* | 1/2003 | Miyake | 705/64 |
| 2004/0003248 A1* | 1/2004 | Arkhipov | 713/170 |
| 2004/0168083 A1 | 8/2004 | Gasparini et al. | |

OTHER PUBLICATIONS

The International Search Report and Written Opinion, mailed Jun. 5, 2008, issued in related International Patent Application No. PCT/US07/083624, filed Nov. 11, 2007.

* cited by examiner

*Primary Examiner* — Gilberto Barron, Jr.
*Assistant Examiner* — Venkat Perungavoor
(74) *Attorney, Agent, or Firm* — Morris & Kamlay LLP

(57) ABSTRACT

A web site can be authenticated by a third party authentication service. A user designates an authentication device that is a shared secret between the user and the authentication service. A web site page includes a URL that points to the authentication service. The URL includes a digital signature by the web site. When the user receives the page, the user's browser issues a request to the authentication service, which attempts to authenticate the digital signature. If the authentication is successful, it sends the authentication device to the user computer.

16 Claims, 7 Drawing Sheets

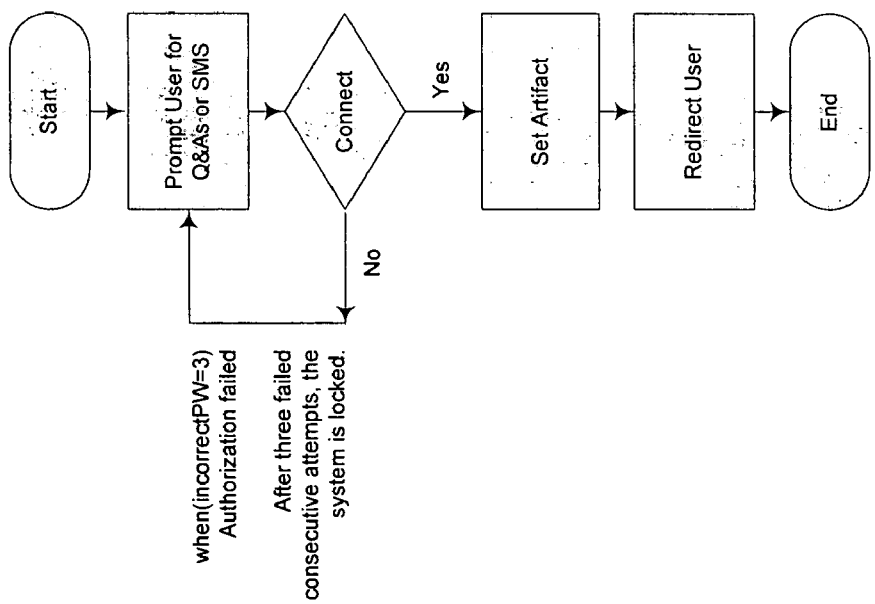

SYSTEM AND METHOD FOR WEBSITE AUTHENTICATION USING A SHARED SECRET

FIELD OF THE INVENTION

The field of the invention is authentication and in particular the authentication of a service provided to users over a network.

BACKGROUND OF THE INVENTION

A user who wants to avail himself of the services provided by a secure web site (such as a site that supports online banking) must typically authenticate himself to the site. This is often accomplished by having the user submit a public username along with a secret password shared only between the user and the bank. If the bank successfully verifies that the password is correct for the corresponding username, the user is permitted to avail himself of the services, such as checking account balances, making payments to third parties, etc.

More sophisticated user authentication schemes can require the user to provide a token capable of generating a One Time Password (OTP) that changes on the basis of time or an event, such as pressing a button on the token. A password based upon the OTP can be sent to the site along with a secret password (such as Personal Identification Number (PIN)) and a username. The site verifies the OTP password, the username and any other secret password before permitting the user to access the site services.

Another problem is authenticating the site to the user. Over the past few years, fraudsters have become increasingly adept at serving pages that masquerade as web site pages of third parties. Typically, links to these fraudulent pages are distributed via e-mails that allege some problem with a user's account and solicit from the user sensitive information, such as usernames and passwords to "logon" on fix the problem. For example, a user can receive an e-mail that purports to be from his bank announcing that his statement is ready to be viewed online by clicking a link in the e-mail. When the user clicks the link, he is directed to a web page that looks like the bank's site but is actually deployed by a fraudster. The user may enter his username and password, which is then received by the fraudster. The fraudster can sell this information or use it himself to logon to the actual bank site, logon as the user and obtain information about or money from the user's bank account. This process, known as phishing, is becoming increasingly widespread and is known to occur for auction sites, brokerage house sites, enterprise extranets and other types of sites provided over networks. Information sought from users by this technique includes usernames, passwords, credit card numbers, bank account numbers and the like.

What is needed is a reliable and robust technology for providing assurance to the user that the site he is viewing is the true and authentic site of the service he is seeking to use.

BRIEF DESCRIPTION OF THE DRAWINGS

FIG. 8 shows an artifact setting flowchart in accordance with an embodiment of the present invention.

DETAILED DESCRIPTION

Figures 1, 2:
FIG. 1 shows a prior embodiment of a CAPTCHA image.
FIG. 2 shows another prior embodiment of a CAPTCHA image.

In accordance with an embodiment of the present invention, a user can register an alphanumeric string that can be chosen by the user and an image. Either or both of the string and the image can be created or submitted by the user or selected by the user from a predetermined set of strings and images presented to the user. The user can also register an audio piece that can be created or submitted by the user or else selected by the user from a predetermined set of audio pieces. These selections or submissions should be made in a secure manner, e.g., over an SSL or TLS connection. These specified items from the user can be stored as attributes of a user profile, e.g., a user account database or directory. The profile can be maintained by the owner of the site to be authenticated or a trusted third party that provides site authentication services.

The items specified by the user can be used alone, in combination with each other or in combination with other items determined by the site or a third party to produce an "authentication device," i.e., a perceptible entity rendered to the user to authenticate the site to the user. The authentication device essentially contains a secret that can be shared between the user and the web site that enables the web site to prove as identity to the user. Since the shared secret or secrets are known only to the legitimate site and the user, when the user perceives such a secret when he is served a page from the site, he can infer that the site is legitimate.

In accordance with embodiments of the present invention, items selected by the user can be combined to enhance the security of the authentication. For example, the user may select a text string and a distortion template that can be combined to produce a substantially unique authentication graphic to be shared as a secret between the user and the authentic site. For example, a device can be created that contains the user chosen image(s) as background. On top of the background various text elements can be dynamically overlaid to convey additional information. The additional text elements can be user generated and chosen text strings or system generated information. For example, the device can be an image that can contain, for example, A user-chosen text string A timestamp (to indicate the freshness of the image)

A web site name (to confirm the identity of site that the user is visiting)

An example of such an image can be produced using CAPTCHA technology. CAPTCHA stands for Completely Automated Public Turing test to tell Computers and Humans Apart. It has been used to prevent servers from being overwhelmed by machine-generated queries from bots and other automata. It presents an automatically generated distorted text string and asks the entity submitting the query to correctly enter the text using a keyboard into a form entry on the page as a condition of processing the query. Automata cannot decipher the text because it is distorted, while a real person can. In this way, machine-generated queries are not processed, while human-generated queries can be.

In accordance with an embodiment of the present invention, CAPTCHA technology can be used in a new way to help authenticate a site to the user, rather than to filter certain types of users (i.e., automata) from utilizing the site. FIG. 1 shows a CAPTCHA image produced by a user who submitted the text "NSF" and selected a distortion template from a set of distortion templates to produce the distorted "NSF" image 100. FIG. 2 shows another example, where the user selected the string "PLUS" from a set of predetermined strings and selected a distortion template from a set of such templates to produce the CAPTCHA image 200. When the user visits the legitimate web site, the site can show the user the user-registered CAPTCHA-based image. The user can recognize the image and be assured that the site is legitimate. Permitting the user to combine items such as strings and templates enhances the security of the system by producing a more customized, unique and distinctive image for the user that can be easier for the user to remember.

CAPTCHA technology can be applied by having an item selected by a user distorted by a randomly-selected CAPTCHA distortion template that can change each time the user visits the site. This can vary the form of the item so as to help defeat automated attacks on the authentication system. In accordance with embodiments of the present invention, an audio portion can be added to the authentication device, as can video, animation, graphics, photographs, etc. The user can specify which, if any, pieces of content can make up the authentication, as well as the order in time in which they manifest. For example, a user can designate a photograph of his dog and, after a specified time delay (e.g., three seconds after the image appears), an audio clip of the dog barking can be played. Similarly, a video clip can be played along with synchronized audio. A series of perceptible events can be rendered in an order prescribed by the user. This can be designated by the user through a convenient interface that, transparently to the user, composes a script describing the rendering of the device over time, i.e., what is to be rendered, when and how. This script can be sent to and played at the user computer upon a successful authentication result, or the components can be sent from an authentication server in the proper order and correct timing.

Items selected by the user can be combined in other ways to increase the security of the system. For example, a set of graphics chosen by the user can be shown together when the user visits the site. This aggregate image can be more unique and thus more difficult to defeat for an attacker. However, aggregate images are more complex and can be more difficult for a user to accurately remember.

It is important that the user accurately remember the items he registers for site authentication in order for the authentication to operate correctly. For example, the user may select an image of a cat, a zebra and a giraffe for authenticating the web site of one of his credit card providers. If he visits the site infrequently, he may remember that he selected pictures of animals, but forget which ones. Further, if the user selects similar images at other web sites operated by issuers of his other credit cards, he may become confused as to which images correspond to which web site. In this way, the site authentication scheme can lose its effectiveness.

In accordance with an embodiment of the present invention, the user can register a single authentication device that can be provided across any number of web sites, even when such sites are owned and operated by different entities. This can reduce or eliminate the need for a user to remember several different authentication devices for verifying the authenticity of numerous sites utilized by the user. This can improve the reliability with which a user recognizes an authentication and is able to distinguish the correct such device from incorrect ones. It can also reduce the administrative burden placed on each site by the need to authenticate itself to its users by offloading this function to a trusted third party site authentication service.

Figure 3:
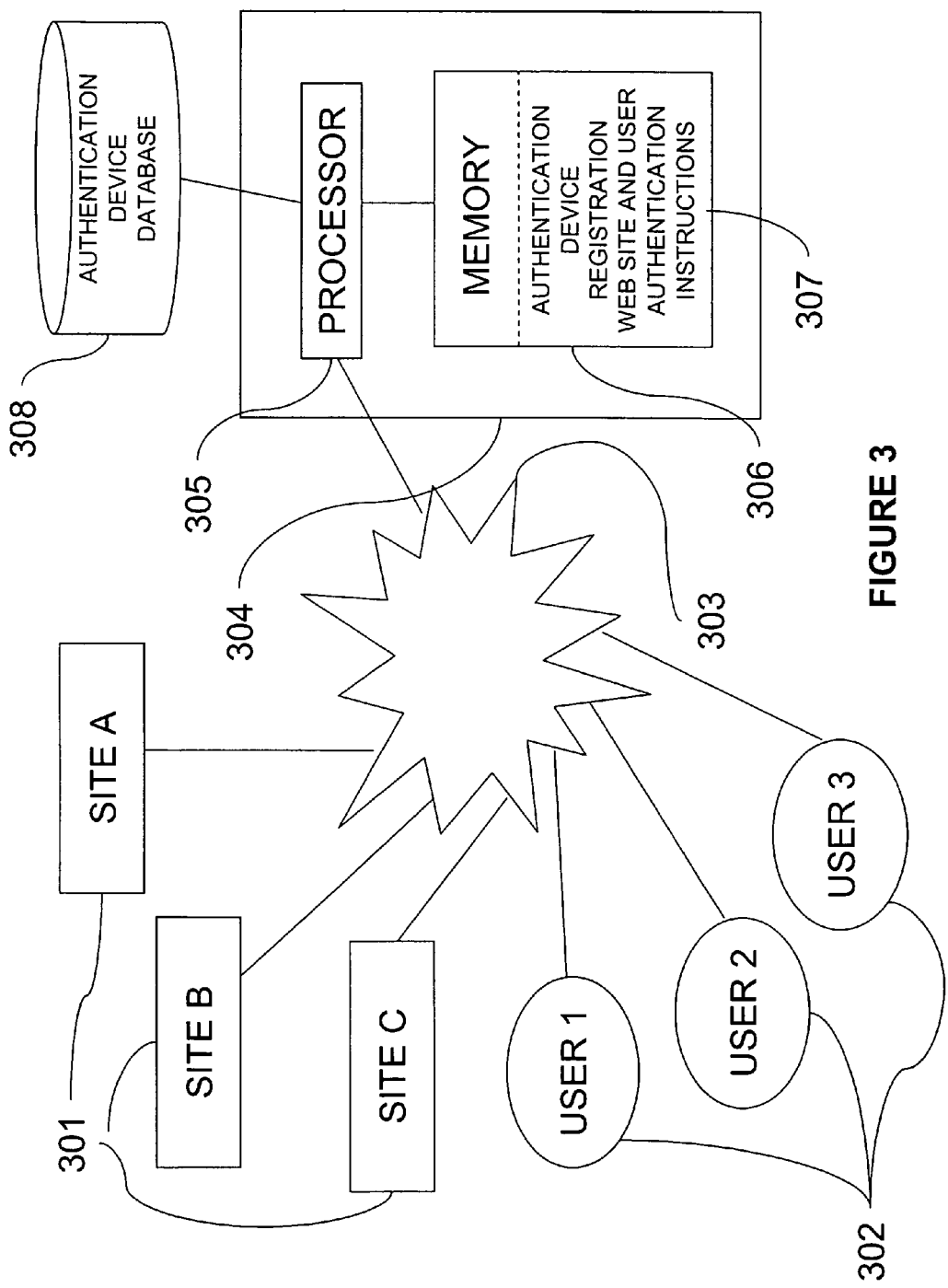
FIG. 3 shows a system in accordance with an embodiment of the present invention.

A system in accordance with such an embodiment is shown in FIG. 3. A set of web servers 301 is coupled to a set of user client computers 302 and site authentication server 304 through network 303. Authentication server includes a processor 305 coupled to a memory 306 that stores instructions 307 adapted to be executed by the processor 305 to perform at least part of the method in accordance with an embodiment of the present invention. Processor 305 can be a general purpose microprocessor, such as a Pentium processor manufactured by the Intel Corporation of Santa Clara, Calif. It can also he an Application Specific Integrated Circuit (ASIC) that embodies at least part of the instructions for performing the method in accordance with the present invention in hardware and/or firmware. Memory 306 can be any device capable of storing digital information, such as RAM, flash memory, a hard disk, a CD, etc. Processor 305 can be coupled to database 308 that can store user registration, profile, authentication device and other pertinent information.

A web site 301 can have an embedded image URL that points to a third party site authentication service operating on authentication server 303. The authentication server 303 can serve authentication device selection and registration pages to the user 302. The user 302 can interact with the authentication server 303 to create a personalized authentication device for use in authenticating web sites 301. This can be done over a secure channel, such as an SSL or TLS connection and the authentication server 303 can lake additional steps to authenticate the user 302.

When the user 302 visits a web site 301, the web site can include a link (such as an image link) pointing to the authentication server 303. The authentication server can authenticate the web site and, if the authentication is successful, serve the personalized authentication device registered to the user 302. Alternatively, when the user 302 visits the web site 301, the web site 301 can send a request to the authentication server 303 for the user's personalized authentication device. If the authentication server 303 successfully authenticates the requesting web server 301, then the authentication server 303 can send the user's registered personalized authentication device to the web server 301. The web server 301 can then show the device to the user 302.

In an embodiment of the present invention, a web site 301 can include on its page a URL to the authentication server 303, where the URL contains a cryptographic token. The token can include, without limitation:

A nonce and/or timestamp
An identifier of the web site 301=member_site_id
A hash of the user's username, H(username)=uid_m
A digital signature based upon, for example, a SSL certificate An example of such a URL is as follows:
http://vipseal.verisign.com/
ShowImage?token=MIIEFDCCA32gAwIBAgIQOCc
FB3u15kGCY0iLy0rH/
jANBgkqhkiG9w0BAQQFADCB2327gZZEyWUWVDr
0uk1VJoR+5LwyNAp8FPGqdG0akUvOUIT2UGs1Eg==

Upon receiving the request generated when the user selects such a link, the authentication server 303 can verify the cryptographic token by validating the signature and the timestamp. hn one embodiment, the token signature is made using a private key of the web site. Any suitable public/private key scheme can be used, such as RSA, ECC, etc. The verification can also ensure that the timestamp, if present is fresh and the nonce, if present has not been used before.

Once the token is successfully verified, the authentication server 303 can fetch and analyze an artifact that helps to identify the user, which can be, for example, a cookie stored at the user computer 302. Based upon the information stored in this artifact, the authentication server 303 can look up the user preferences (e.g., stored in database 308) and generate an authentication device to authenticate the site to the user. The device can include, without limitation, A user-chosen text string A user-chosen background image (e.g., distortion template, graphic, video, audio, etc.)

The web site name (which can be based upon the token)

A digital signature hidden in an image, audio, video or other portion

Executable or interpretable code, such as a script that describes how and when portions of the device are to be rendered A timestamp When the user sees the authentication device so configured, he can be assured that he is visiting a valid website and not a phishing site. A digital signature can be hidden in an element of the authentication using steganographic techniques, such as those known in the art. For example, a digital signature can be hidden in a background graphic, in a video segment, in an audio segment, etc. In some embodiments, the signature can be hidden across more than one component, e.g., a first part of the signature can be hidden in a graphic component, a second part of the signature can be hidden in an audio segment, a third part of the signature can be hidden in a video segment, etc. The digital signature can be created at the authentication server using a private key of the authentication server. The signature can be verified at the user computer to provide assurance to the user that the authentication server is the true source of the device.

In accordance with an embodiment of the present invention, the authentication server can register users and maintain a database of user preferences. The primary key for a user preferences record can be a user identifier (uid.) The authentication can also maintain a record of sites that have received requests from a particular user. The authentication server can set an artifact for a device, which can be a cookie on the user computer. The artifact can contain enough information to identify the user, e.g., it can contain uid.

If a user has managed to remove an artifact, the authentication server can recover by, for example, employing out-of-band authentication. Such out-of-bound authentication can use challenge-response, a telephone call for verification, SMS, etc.

The authentication server also serves up the personalized authentication devices. Such devices can be personalized to the user and to the site that the user is visiting. They can be comprised of images, text, audio, video, animation or any other perceptible medium, either alone or in combination.

Another function of the authentication sewer can be establishing the pre-shared keys with the web sites that subscribe to the site authentication service (relying party sites.) SSL certificates can be used for this purpose, especially if the authentication service is provided by a certificate issuer. This could avoid the need to implement additional key management functionality for this purpose. The pre-shared keys can be used to sign the tokens. Of course, symmetric keys can also he used for this function.

The authentication server can make available appropriate reports and statistics to the relying parties.

The web site can use a SDK provided by the authentication service to register and maintain the pre-shared key, which the site can use to sign the token. The SDK can also be used by the site to create the tokens and embed the URL containing the token in appropriate site web pages. The site can also alter the workflow during login to incorporate the display of the authentication device from the authentication server and monitor appropriate reports and statistics from the authentication service.

Figure 4:
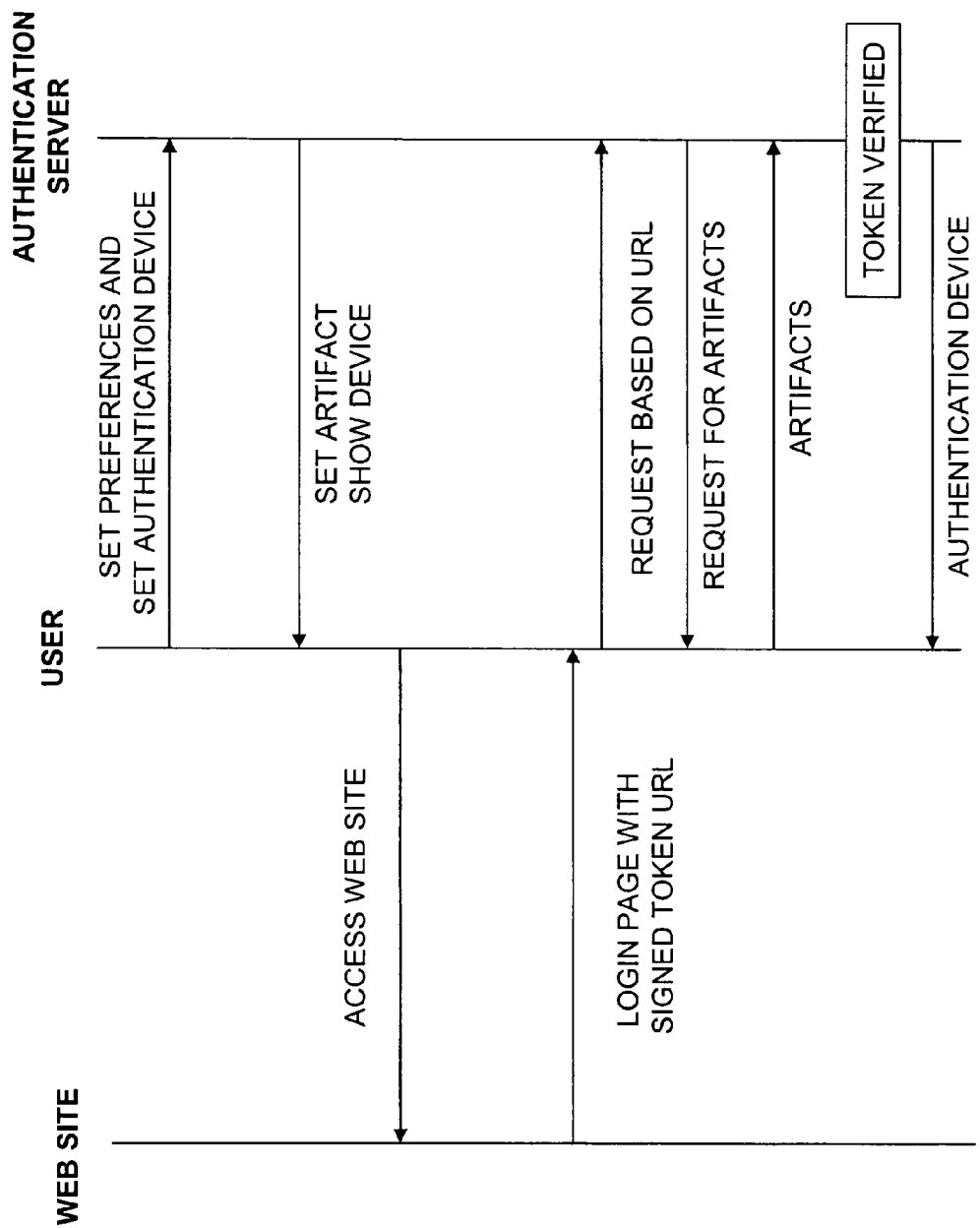
FIG. 4 shows a message flow in accordance with an embodiment of the present invention.

One transaction flow in accordance with an embodiment of the present invention is shown in FIG. 4. A user can register with an authentication server by setting his preferences designating an authentication device. The authentication server can set a cookie on the user computer and display the chosen device for the user to remember. When the user wants to login to a web site that subscribes to the authentication service, the site can return a login page that can include a link (such as a URL) for displaying the authentication device to the user. This link can point to the authentication server and can contain the token. While rendering the page, the user's browser can initiate a request based upon the URL to the authentication server and artifacts (such as cookies or other information that can be stored at the user's computer) can be sent to the authentication server. The server can use the artifacts (e.g., cookies) to identify the user and determine user preferences. The server can verify the token, e.g., by checking the signature. If the token is successfully verified by the authentication server, the server can create the authentication device for the user and send it to the user computer, where it can be incorporated into the web page retrieved by the user from the web site.

Figure 5:
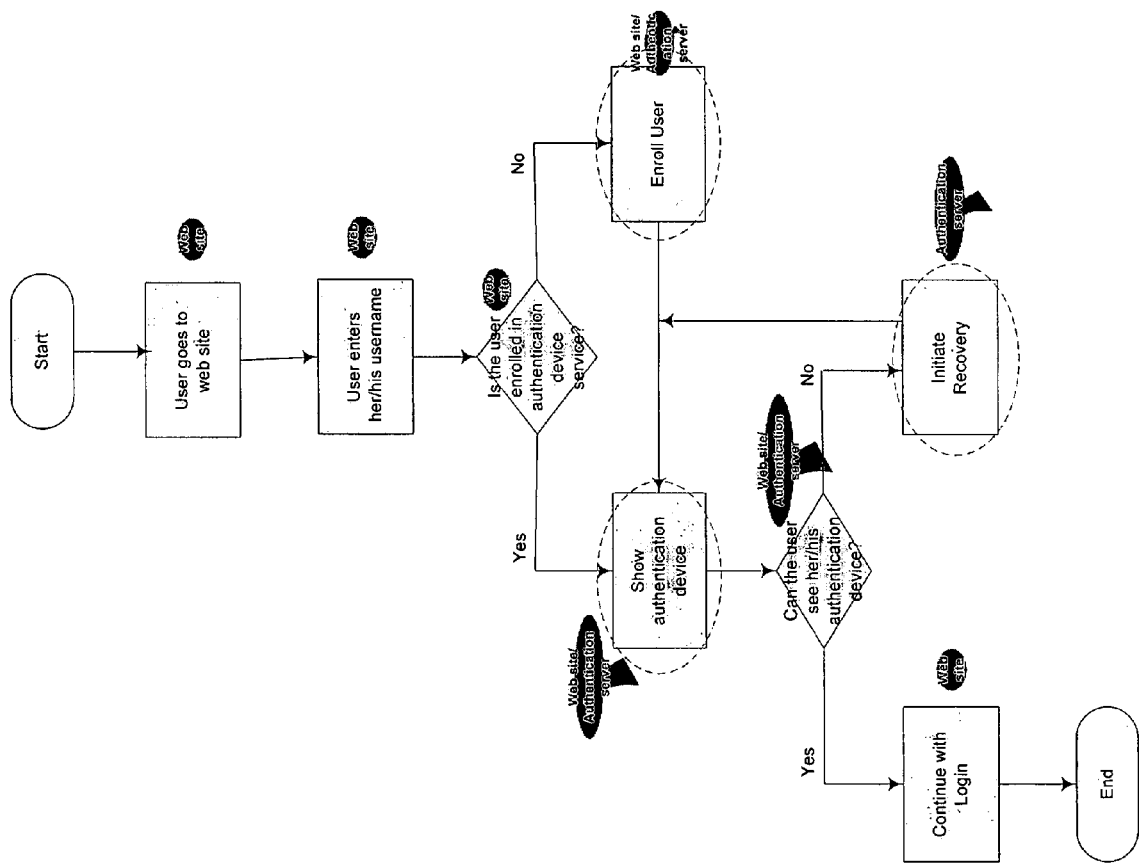
FIG. 5 shows an enrollment flowchart in accordance with an embodiment of the present invention.
Figure 6:
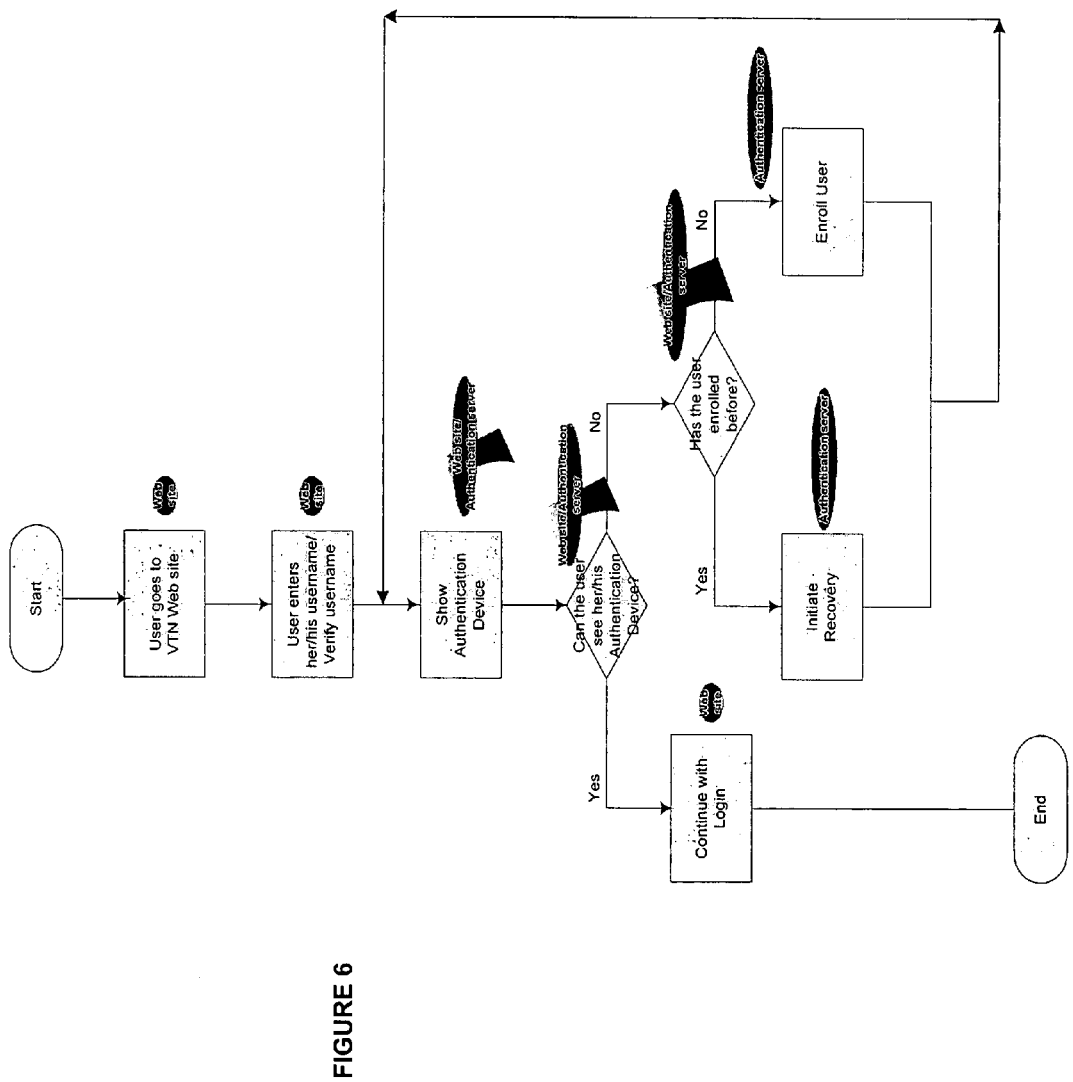
FIG. 6 shows an enrollment flowchart in accordance with another embodiment of the present invention.

Registration transaction flows are shown in FIGS. 5 and 6. The registration site can be hosted either at the authentication server or at a web site that has subscribed to the authentication service. The user can be redirected to such a registration site from a web site. The redirect can include a member_site_id, which can be an identifier that uniquely identifies this particular member site to the authentication service. It can also include uid_m, which can be a hash of a user identifier, H(userid_member). This can be an opaque identifier that can be derived from some unique user identifier at the member web site, e.g., from the username or an internal user handle.

If a particular user has never registered for a personal site seal at any of the participating member sites, then the user can be prompted to configure various settings, such as:

by selecting one or more personalized image(s) from a library of images.

by selecting a personalized text string.

by selecting an audio preference. [actually this could be the text string itself?]

by designating a mechanism for recovery, e.g., by providing answers to a set of challenge questions, or by providing a phone number for telephone or SMS-based out-of-band authentication.

For security purposes, the library of images should be sufficiently large. Alternatively, the user can be permitted to upload images, videos, sound clips, etc. To ensure a good distribution of image selection if the user is asked to select from a set of images, the registration server should use an algorithm that ensures a good distribution (e.g. random selection) to select 'm' images from the library, and then display them to the user to choose from.

Once the preferences are selected by the user, a unique identifier can be created for the user, uid_vtn. The preferences can be saved against the uid_vtn. The service can also maintain a list of all the member sites at which the user is 'registered', e.g., by maintaining a mapping of uid_m's for that particular uid_vtn. Hence, all or part of the following information can be saved into the database:

uid_vtn image preference(s)

video preference(s)

text string preference(s)

audio preference(s)
device scripts(s)
<uid_m__1, member_site_id__1>, <uid_m__2, member_site_id__2>, . . .

A device script can be a script describing the mixing of the elements in an authentication device. A pseudo-code example of such as script is:

start
render(image__32)
wait(3 seconds)
play(sound__3456)
effect(pulse image)
run(video__427)
display(text_string__75489(distortion pattern__56782))
end Designations such as image__32, sound__3456 are meant to be identifiers of particular pieces of content, e.g., an image and a sound, respectively. Such pieces of content can be predetermined pieces selected and arranged by a user, uploaded by a user and stored, or a combination thereof.

An artifact (such as a cookie) can be saved on the user's computer. This artifact can include an obfuscated/encrypted uid_vtn that can uniquely identify the user and hence the user's preferences.

The registration service/server can then redirect the user back to the member web site. The member web site can include a URL for displaying the personalized authentication device.

Figure 7:
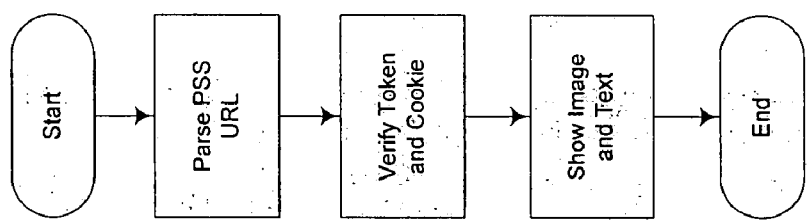
FIG. 7 shows a verification flowchart in accordance with an embodiment of the present invention.

A transaction flow for displaying the authentication device is shown in FIG. 7. The web site can include on its page a URL, an example of which is shown below.

http://vipseal.verisign.com/
Showhnage?token=MIIEFDCCA32gAwIBAgIQOCcFB
3u15kGCY0iLy0rH/
jANBgkqhkiG9w0BAQQFADCB2327gZZEyWUWV
Dr0uk1VJoR+
5LwyNAp8FPGqdG0akUvOU1T2UGs1Eg==

This URI, can contain a cryptographic token. The token can include
  A nonce and/or a timestamp
  An identifier for a member website=member_site_id
  A hash of a user identifier, H(username)=uid_m
  A digital signature, e.g., using a SSL certificate that can be issued to the web site by the operator of the authentication service Upon receiving request based upon the URL, the authentication server can verify ("authenticate") the cryptographic token by validating the signature and the timestamp. It can also ensure that the nonce has not been used before. If the authentication server cannot successfully authenticate the token, then the user's authentication device is not sent to the user computer. Rather, a warning can be scat indicating that the authentication was not successful, that the site maybe fraudulent, etc. In one embodiment, the user can select a second authentication device (e.g., a skull and crossbones) that indicates an unsuccessful authentication result from the authentication server.

If the token is successfully verified, the service can fetch and analyze the artifact that helps to identify the user. This artifact can contain the uid_vtn. If for some reason the artifact cannot be found then, in one possible scenario, the user is not registered. In this case, the web site can prompt the user to register for a personalized authentication device, as described above. In another scenario, the user could he registered, but is using a new machine or has deleted the artifact. In this case, the user should be taken through a recovery process, such as that described below. An embodiment of the verification process is shown in FIG. 7. An embodiment of the process that can set a cookie or other artifact on the user computer is shown in FIG. 8.

Based upon the artifact obtained from the user computer, the service can look up the user's preferences and generate a personalized authentication device that can show the following information to the user:
  User chosen text string(s)
  User chosen audio clip(s)
  User chosen video(s)
  User chosen animation(s)
  User chosen graphic(s)
  User chosen background image(s)
  User Designated Script
  A web site name (e.g., from the token)
  A timestamp These can be mixed by the user, which can he recorded in a script can be as described above. When the user sees the personalized authentication device, he can be assured that he is visiting a valid website and not a phishing site.

A recovery transaction flow is shown in FIG. 8. A recovery process can be triggered if the user is accessing a member site from another computer or if the user deletes the artifact. If the user does not see the authentication device at a member web site at which he has already registered, then the user identity should be verified before the recovery process is implemented. One way to do this is to have the member web site verify the user identity and then redirect the user to the authentication server with a security token that indicates that user identity has been confirmed. The redirect can include the uid_m for the user. Since the server maintains a mapping of uid_m's and uid_vtn, the server can determine the uid_vtn from this information. Alternatively, the member site can redirect the user to the authentication server (or a suitable recovery server.)

The service can then verify the user's identity using the information that the user provided during registration. This can help to identify the uid_vtn.

Once the service has determined the correct uid_vtn, the authentication server can save an artifact on the user's computer, such as a cookie. This artifact can contain an obfuscated/encrypted uid_vtn that can uniquely identify the user and hence preferences.

After the artifact has been stored, the recovery service/server can redirect the user back to the member web site. The member web site at that time can include a URL for displaying the personalized authentication device for the user. Now, the user should he able to see the personalized seal as described above and be assured that the site is legitimate.

An embodiment of the present invention can establish a secret symmetric key that is shared between the web site and the authentication service. The symmetric key (e.g., one used in an algorithm such as DES, AES, etc.) can be used by the web site to sign the token that is included in the URL sent to the user computer when the user's browser is loading the web site's page. The URL, which can point to the authentication server, can cause the token to be sent from the user computer to the authentication server, which can use its own copy of the symmetric key to authenticate the digital signature. If the signature is successfully authenticated, then the authentication server can send the authentication device to the user computer.

The embodiments of the present invention described above are meant to illustrate and not to limit the scope of the claimed invention. Those of skill in the art will appreciate that the above description teaches other embodiments that, although not detailed above, are still encompassed by the claims.

What is claimed is:

1. A method for authenticating a web site to a user, including:

receiving at a third party authentication server a request from a user computer, the request based upon a URL contained in a page sent from a web server to the user computer, where the URL points to the authentication server and includes a digital signature created using a cryptographic key of the web server;

receiving a user identifier from the user computer;

authenticating the web server by verifying that the digital signature is the digital signature created using the cryptographic key of the web server;

if the web server is successfully authenticated, then sending a copy of an authentication device to the user computer, the authentication device being a shared secret between the user and the authentication server.

2. The method of claim 1, wherein the digital signature included in the URL is made using a symmetric cryptographic key that is a shared secret between the authentication server and the web server.

3. The method of claim 1, wherein the digital signature included in the URL is made using a private cryptographic key at the web server.

4. The method of claim 1, wherein receiving a user identifier from the user computer includes sending a request from the authentication server to the user computer for an artifact stored at the user computer and receiving the artifact from the user computer at the authentication server, where the artifact includes a user identifier.

5. The method of claim 1, further including receiving at the authentication server from the user a designation of the authentication device, where the designation includes a combination of at least two from the group of: a text string, an audio segment, a video segment, an animation segment, a graphic and a distortion template selection.

6. The method of claim 1, wherein the authentication device includes components from the group of a text string, an audio segment, a video segment, and animation segment, a graphic segment and a distortion template, and wherein the authentication device includes a digital signature hidden in at least one of said components.

7. A system for authenticating a web site to a user, including:

a processor;

a memory coupled to said processor, said memory storing instructions adapted to be executed by said processor to receive a URL from a user computer, where the URL includes a digital signature created using a cryptographic key at a web server, authenticate the web server by verifying that the digital signature is the digital signature created using the cryptographic key of the web server, and if the web server is authenticated, send to the user computer an authentication device based upon a user identifier received from the user computer, the authentication device being a shared secret between the user and the authentication server.

8. The system of claim 7, wherein the digital signature is made using a symmetric cryptographic key at the web server, said memory storing a copy of the symmetric cryptographic key and said instructions adapted to be executed by said processor to authenticate the digital signature using the symmetric cryptographic key.

9. The system of claim 7, wherein the digital signature is made using a private cryptographic key at the web server, said memory storing a copy of the public key corresponding to the private key and said instructions adapted to be executed by said processor to authenticate the digital signature using the public key.

10. The system of claim 7, further including a database storing a record that correlates a user identifier with an authentication device designated by the user.

11. The system of claim 10, wherein the authentication device includes a combination of at least two from the group of: a text string, all audio segment, a video segment, an animation segment, a graphic and a distortion template selection.

12. The system of claim 7, wherein the authentication device includes components from the group of a text string, an audio segment, a video segment, and animation segment, a graphic segment and a distortion template, and wherein said instructions are further adapted to be executed by said processor to hide a digital signature in at least one of said components of the authentication device.

13. A non-transitory computer-readable medium storing instructions adapted to be executed by a processor to perform steps including:

receiving at a third party authentication server a request from a user computer, the request based upon a URL contained in a page sent from a web server to the user computer, where the URL points to the authentication server and includes a digital signature created using a cryptographic key of the web server;

receiving a user identifier from the user computer;

authenticating the web server by verifying that the digital signature is the digital signature created using the cryptographic key of the web server;

if the web server is successfully authenticated, then sending a copy of an authentication device to the user computer, the authentication device being a shared secret between the user and the authentication server.

14. The computer-readable medium of claim 13, wherein said instructions are further adapted to be executed by the processor to send a request from the authentication server to the user computer for a artifact stored at the user computer and receive the artifact from the user computer at the authentication server, where the artifact includes a user identifier.

15. The computer-readable medium of claim 13, wherein said instructions are further adapted to be executed by the processor to receive at the authentication server from the user a designation of the authentication device, where the designation includes a combination of at least two from the group of: a text string, an audio segment, a video segment, an animation segment, a graphic and a distortion template selection.

16. The computer-readable medium of claim 13, wherein the authentication device includes components from the group of a text string, an audio segment, a video segment, and animation segment, a graphic segment and a distortion template, and wherein said instructions are further adapted to be executed by the processor to hide a digital signature in at least one of said components of the authentication device.

* * * * *